(12) United States Patent
Massie

(10) Patent No.: US 6,285,175 B1
(45) Date of Patent: Sep. 4, 2001

(54) DC-TO-DC CONVERTER WITH TRANSIENT SUPPRESSION

(75) Inventor: Howard L. Massie, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/563,662

(22) Filed: May 2, 2000

Related U.S. Application Data

(63) Continuation of application No. 09/130,524, filed on Aug. 5, 1998.

(51) Int. Cl.$^7$ ....................................... G05F 1/40
(52) U.S. Cl. ..................... 323/290; 323/284; 323/224; 323/225
(58) Field of Search ................................. 323/282, 284, 323/285, 290, 293, 224, 225

(56) References Cited

U.S. PATENT DOCUMENTS

| | | |
|---|---|---|
| 4,380,729 * | 4/1983 | Kaku et al. ............................ 323/285 |
| 5,428,524 | 6/1995 | Massie . |
| 5,455,501 | 10/1995 | Massie . |
| 5,534,771 | 7/1996 | Massie . |
| 5,587,650 | 12/1996 | Massie . |
| 5,617,016 | 4/1997 | Borghi et al. . |
| 5,623,198 | 4/1997 | Massie et al. . |
| 5,627,413 | 5/1997 | Mughir et al. . |
| 5,629,610 | 5/1997 | Pedrazzini et al. . |
| 5,650,715 | 7/1997 | Massie . |
| 5,678,049 | 10/1997 | Massie . |
| 5,764,047 | 6/1998 | Massie . |
| 5,777,461 | 7/1998 | Massie et al. . |
| 5,781,419 | 7/1998 | Kutkut et al. . |
| 5,808,377 | 9/1998 | Massie et al. . |
| 5,811,889 | 9/1998 | Massie . |
| 5,822,166 | 10/1998 | Massie . |
| 5,831,405 | 11/1998 | Massie . |
| 5,845,141 | 12/1998 | Massie . |
| 5,877,611 * | 3/1999 | Brkovic ............................... 323/222 |
| 5,889,387 | 3/1999 | Massie . |
| 5,914,591 * | 6/1999 | Yasuda et al. ....................... 323/284 |
| 5,929,692 * | 7/1999 | Carsten ............................... 327/531 |

* cited by examiner

Primary Examiner—Peter S. Wong
Assistant Examiner—Gary L. Laxton
(74) Attorney, Agent, or Firm—Justin Scout

(57) ABSTRACT

Briefly, descriptions of embodiments in accordance with the invention, such as a DC-to-DC converter with transient suppression, are provided.

8 Claims, 3 Drawing Sheets

DC-TO-DC CONVERTER WITH TRANSIENT SUPPRESSION

RELATED APPLICATION

This is a continuation patent application of patent application Ser. No. 09/130,524, filed on Aug. 5, 1998, titled "DC-to-DC Converter with Transient Suppression, " by Massie, assigned to the assignee of the present invention and herein incorporated by reference.

BACKGROUND

1. Field

The invention relates to direct-current (DC) to direct-current (DC) converters and, more particularly, to DC-to-DC converters with transient suppression.

2. Background Information

Direct-current to direct-current converters are well-known in the art. Such circuitry or devices are typically employed to convert from one DC voltage signal level to another DC voltage signal level. This may be useful in a variety of environments. A number of such converters are well-known.

One such converter is referred to as the Buck Converter. This converter configuration may be employed to convert from a high voltage, such as, for example, 48 volts, to a low voltage, such as, for example, 2 volts. As this example illustrates, this reduction in voltage is a reduction of at least an order of magnitude in voltage level. Several problems may arise in a circuit where a reduction in voltage this large is employed. It would be desirable if a circuit to accommodate such a large drop in voltage were available.

SUMMARY

Briefly, in accordance with one embodiment of the invention, a DC-to-DC converter includes: a first circuit to sense when the converter output voltage occurs outside a substantially pre-determined range, and a second circuit to adjust the converter load current, based at least in part, upon a signal provided by the first circuit.

Briefly, in accordance with another embodiment of the invention, a circuit to suppress voltage transients for use in a DC-to-DC converter having a primary inductor includes: another circuit inductance lower than the inductance of the primary inductor. The another circuit inductance is coupled in the circuit to be activated when the load voltage of the DC-to-DC converter occurs outside a substantially predetermined range. The another circuit inductance is further coupled in the circuit so that it has the capability to modify the load current during activation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As previously described, it may be desirable in some circumstances to convert from a relatively high DC voltage level to a relatively low DC voltage level, particularly at high currents. For example, as previously described, converting from a voltage of 48 volts to approximately 2 volts may be desirable in some situations. Likewise, currents may be on the order of 60 amps, which is relatively high compared to 15 amps, for example, which is more typical in some environments. One problem associated with converting from such a high voltage to such a low voltage is maintaining a low duty cycle while also achieving relatively efficient energy conversion.

One approach to accomplish this is to operate the converter at a relatively low switching rate, such as on the order of 33 kilohertz, to reduce switching losses when operating at the low duty cycle. The low frequency allows the "on-time" of the small duty cycle to be long enough so that the switching time is much less than the "on-time." Also, where a Buck Converter is employed, the input current has a relatively high ripple at a high output or load current, such as 60 amps. For example, a 5 volt to 2.5 volt converter would produce, for example, a 30 amp root-mean-square (RMS) value with a conventional Buck Converter, which is undesirable. However, by employing a low duty cycle, as previously described, this reduces the input ripple current to approximately 10 amps RMS, which can then be filtered with a relatively small amount of input capacitance. A third issue associated with converting from a relatively high voltage to a relatively low voltage is how to handle the transient response of the DC-to-DC converter. In order to convert from a relatively high voltage signal level to a relatively low voltage signal level, such as at least a drop in an order of magnitude, the induction employed will typically be too large to suppress voltage transients occurring from a 60 amp step or increase in current.

Figure 1:
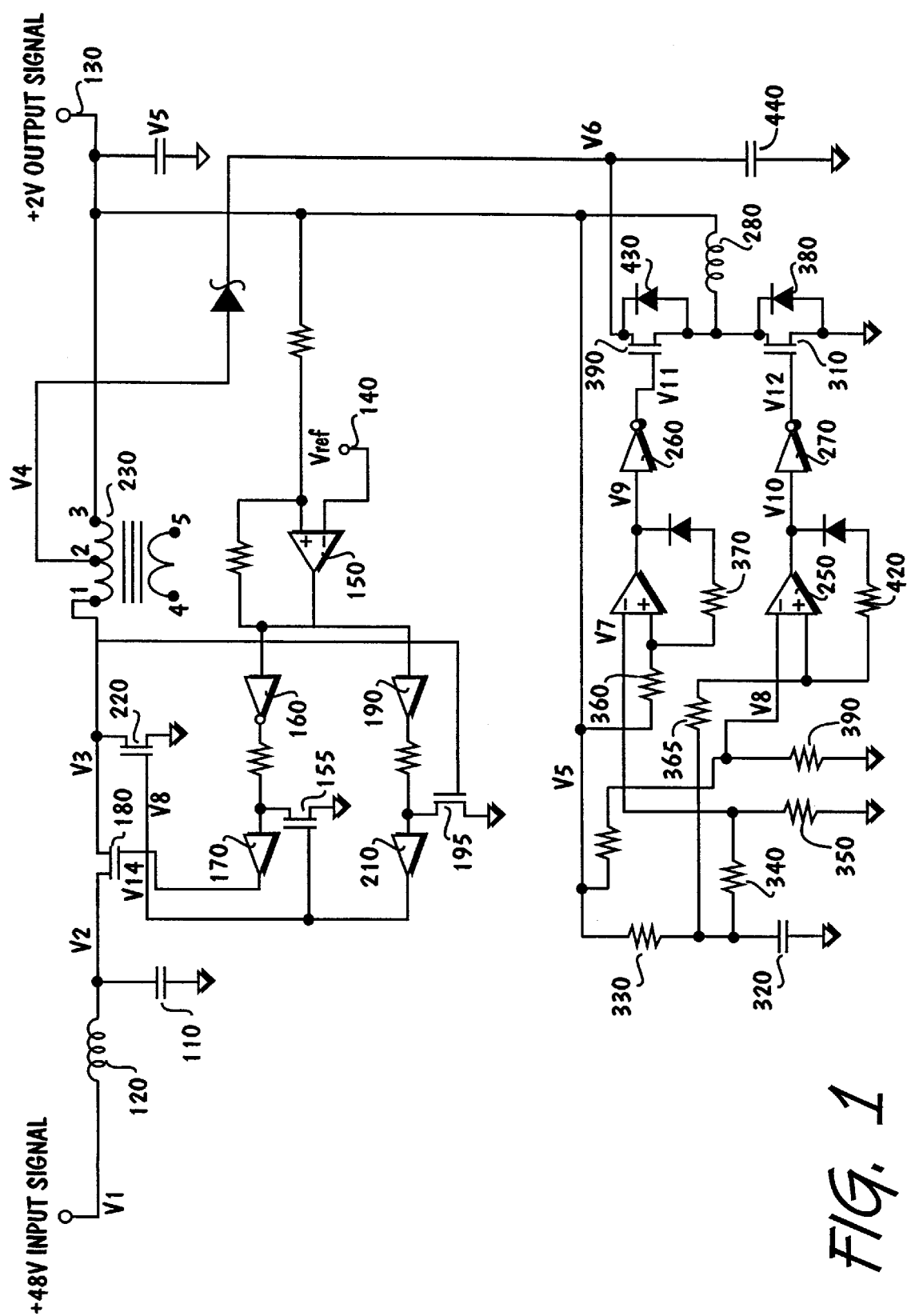
FIG. 1 is a circuit diagram illustrating an embodiment of a DC-to-DC converter in accordance with the present invention.

In one embodiment in accordance with the present invention, such as embodiment 100 illustrated in FIG. 1, a circuit may sense or monitor voltage excursions outside of a converter output voltage regulation band. It may then either apply a voltage to a small inductor to suppress an increased current load or drain the current from the load during a decrease in load current. The small inductor has an inductance less than the primary inductor for the DC-DC converter in this embodiment. In this embodiment, this may be accomplished using field-effect transistor (FET) switches coupled to the inductor of much lower inductance than the primary inductor, although the invention is not limited in scope in the respect. The small inductor provides the fast transient response desired to maintain voltage regulation. Likewise, this transient suppression circuit is an efficient switching regulator circuit. Of course, the invention is not restricted in scope to using a a small inductor, as explained later and illustrated in FIG. 2.

Referring to FIG. 1, in this embodiment, the 48 volt input voltage is stored on capacitor 110 through filter inductor 120. When output voltage signal at terminal 130, designated as voltage signal V5, is less than reference voltage signal 140 at one of the input ports of comparator 150, the output signal, designated V13, will become "low." In this context, the terms "low and "high" refer to digital voltage signals; however, the voltage range for the signals and the designation as low or high does not restrict the scope of the invention. This signal is then inverted by driver 160, which drives the input port of FET driver 1 70. The output voltage signal of 170, designated V14, will drive the gate of FET 180 "high," turning on the transistor. If the output signal of driver 210, designated voltage signal V8, is low, then transistor or FET 155 will turn off, allowing the input signal of driver 170, to become high. Transistor 155 ensures that FET 180 will not turn on until transistor 220 is off. Not shown in this particular embodiment is a boost circuit, which drives the gate of transistor 180 ten volts higher than the voltage designated V2. Many of a number of well-known boost circuits may be employed and, in this embodiment, this circuit is incorporated into driver 170. Substantially simultaneously, the voltage signal designated V13 has passed through non-inverting buffer 190 and FET driver 210 to the gate of synchronous rectifier 220. Transistor 220 is turned off by this low transitioning signal. With transistor 180 turned on, the voltage of the source of transistor 180, now, at least approximately equals the voltage signal designated as V2 with a small resistive loss across transistor 180. The voltage designated as V3 is applied in this embodiment to pin 1 of transformer 230. Current is supplied to the output terminal or port 130 through the inductance of this winding of transformer 230. This current is approximately equal to the load current and ramps up. In normal buck regulator operation, the current though the inductor on average is equal to the load current. When transistor 180 is on, the current ramps up to a peak value approximately equal to the peak-to-peak value of the ripple current. With transistor 220 on, the inductor current ramps down from the peak value approximately equal to the peak-to-peak value of the ripple current. Transistor 220 handles this current when transistor 180 is off. When the output signal of driver 170 transitions to a high state, transistor 180 will turn off and transistor 220 will turn on. Transistor 220 maintains the output current when transistor 180 is off. Therefore, the circuit operates as a simple ripple regulator when low transients are not present. The inductance of transformer 230 is relatively high to reduce the output ripple current with associated resistive losses.

Figure 2:
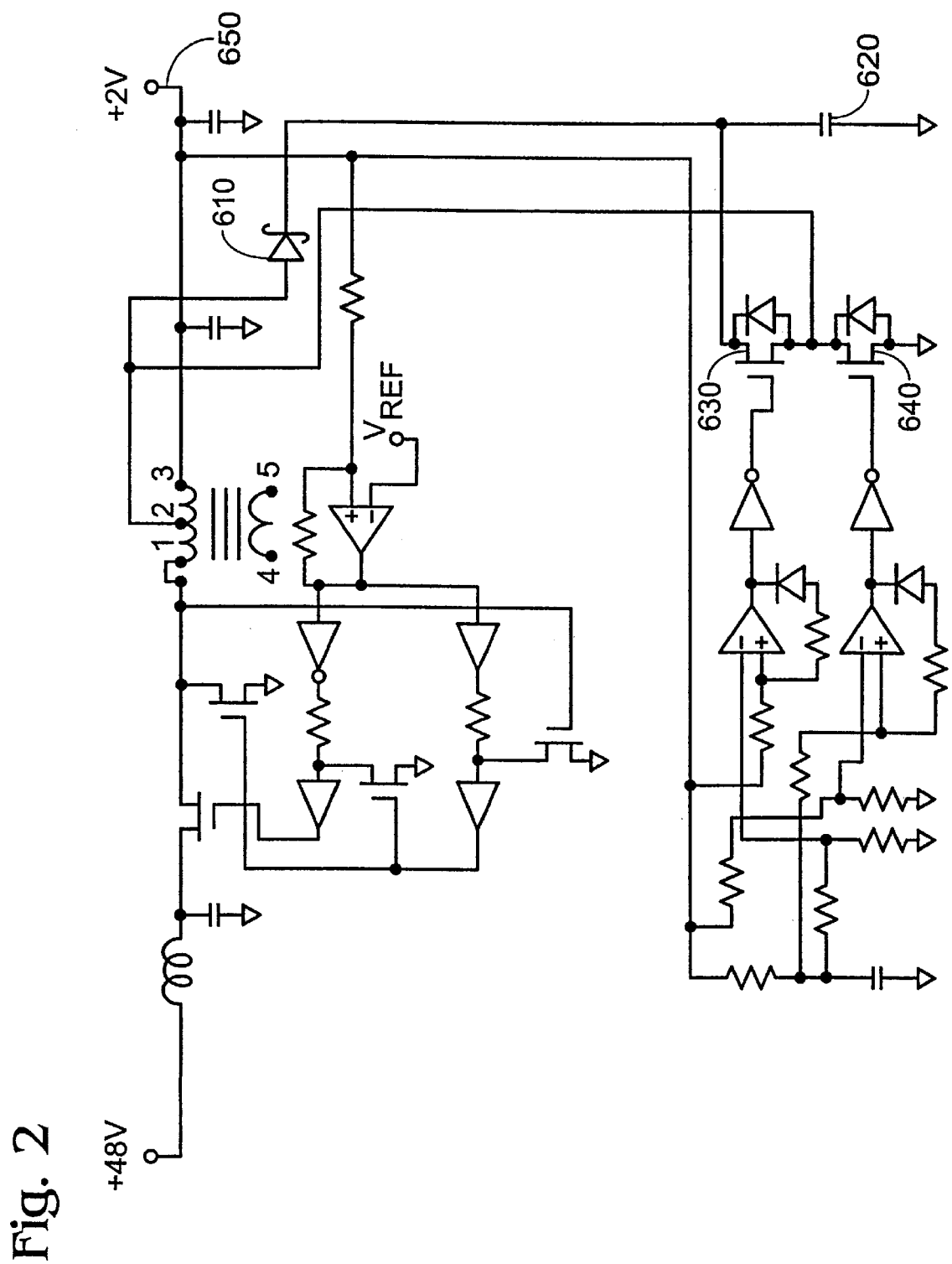
FIG. 2 is a circuit diagram illustrating another embodiment of the DC-to-DC converter in accordance with the present invention.

In this particular embodiment, in order to address the voltage transients associated with a step in current, a first circuit is employed to sense when the converter load voltage occurs outside a substantially predetermined range and a second circuit is employed to adjust the converter load current based, at least in part, upon a signal provided by the first circuit. For example, where the DC-to-DC converter includes a primary inductor, such as inductor 120, sufficient to convert an input DC voltage signal to an output DC voltage signal at least approximately an order of magnitude smaller, the second circuit includes another inductor having an inductance smaller than the inductance of the primary inductor. However, instead of employing another inductor, in some embodiments another circuit inductance may be employed, such as a winding of transformer 230, as illustrated in FIG. 2 and described in more detail below. Likewise, this circuit inductance is coupled in the circuit to suppress voltage transients so as to be activated when the load voltage of the DC-to-DC converter occurs outside a substantially predetermined range and the circuit inductance is further coupled in the circuit so that it has the capability to modify the load current during activation, as shall be described in more detail below.

Comparators 240 and 250 detect the presence of transient voltages in the output voltage, designated V5 in FIG. 1. The voltage on capacitor 320 is equal to the average voltage value of the output or load voltage and has a time constant substantially equal to the capacitance of capacitor 320 times the resistance of resistor 330. During a transition or transient, the voltage on capacitor 320 will be substantially constant. Resistors 340 and 350 establish a lower threshold voltage, designated V7 in FIG. 1, for comparator 240. The voltage designated V5 will drop during an increase in load current until that voltage is lower than V7, which will cause the output signal of FET driver 260, designated V11 in FIG. 1, to become high because a comparator output signal has transitioned low. A "high" voltage signal V11 turns "on" transistor 290, which applies voltage V6 to voltage V5 by means of inductor 280. In this embodiment, inductor 280 is a low inductance compared to transformer 230 and, therefore, current rapidly increases in inductor 280. The current of inductor 280 inhibits the output voltage signal V5 from dropping further and, in fact, may increase the value of voltage V5 until the voltage at the positive input terminal of driver 240 exceeds the reference voltage V7. When this occurs, the output signal of driver 240 will become high, which will turn transistor 290 off via inverter driver 260. Resistors 360, 370 and diode 380 provide hysteresis to the positive input port of comparator 240 by lowering the input signal to the positive input port of 240 by the hysteresis voltage. With transistor 290 off, the current flowing in inductor 280 will continue to flow through diode 380 and the current in inductor 280 decreases. If the load transient is still present after transistor 290 turns off, then voltage V5 will drop again, repeating the cycle, in ripple regulator fashion. This on/off cycle will continue until either the load step has dissipated or the DC-to-DC converter has increased its current through transformer 230 to support the load. The oscillation frequency of the loop including comparator 240, transistor 290 and inductor 280 will be in this embodiment in the 100 to 200 kilohertz range, although, of course, the invention is not limited in scope in this respect.

Driver 250, transistor 310, inductor 280 operate in substantially the same manner as the loop just previously described, except this loop is intended to operate when voltage V5 is rising due to a load current decrease. These circuits, therefore, form a ripple regulator during the transient in a similar manner as described above with respect to transistor 220. Here, the floating reference voltage of capacitor 320 is coupled to the positive input port of comparator 250 through resistor 365. Since voltage V5 is dropped by the voltage attributable to resistor divider 390 and 410, the output signal of comparator 250 is normally high. As voltage signal V5 rises, voltage signal V8 will then exceed the voltage on the positive input port of the comparator, which causes the output signal of comparator 250 to become low. Inverting FET driver 270 turns on transistor 310, which will sink current through inductor 280. Voltage V5 will decrease until voltage V8 is less than the reference voltage, plus the hysteresis, determined in this embodiment by resistor 420 and diode 425. Transistor 310 turns off and the current flowing in inductor 280 then flows in the internal body of diode 430 into the voltage on capacitor 440, having a voltage designated as V6 in FIG. 1. Inductor current continues until the energy goes to at least approximately zero, or until the ripple regulator function again turns on transistor 310. In this embodiment, diode 430 is a diode internal to transistor 290. Such diodes are well-known with respect to metal-oxide semiconductor transistors. If the load current is still low and the current through transformer 230 has not decreased to the load current, then this oscillation cycle will continue until transformer 230, inductor 280 and the load current are balanced.

As the previous description illustrates, in this particular embodiment, the steady-state current loads are applied through the main self-oscillating ripple regulating Buck Converter around the main winding of transformer 230 and provide the primary or main DC-to-DC converter. However, this has a relatively slow response to load current steps due, at least in part, to the large inductance employed for conversion from a relatively high voltage level to a relatively low voltage level. Fast transient response to load steps is, therefore, in this embodiment, provided by a second self-oscillating circuit coupled around a low inductance inductor 280. This circuit in this embodiment either takes energy from or puts energy back into a storage capacitor, such as capacitor 440, via a secondary output port of the steady state regulator.

Figure 3:
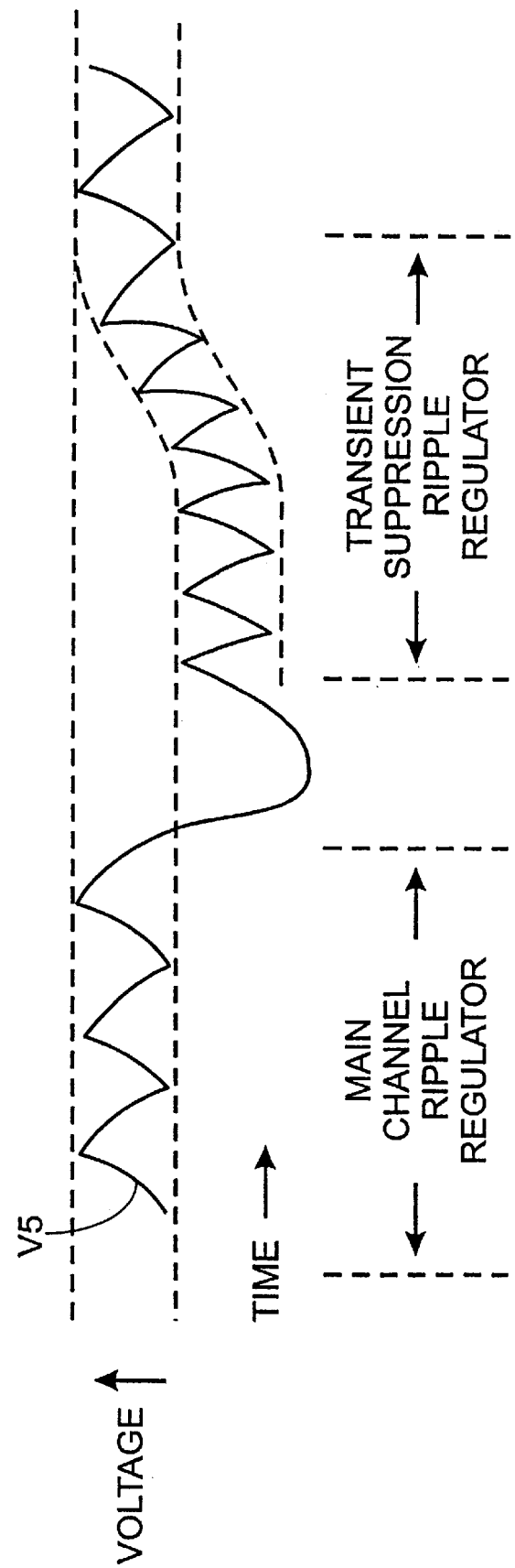
FIG. 3 is a plot illustrating an output voltage waveform that may be produced by an embodiment of a DC-to-DC converter in accordance with the invention.

FIG. 3 is a plot illustrating an output voltage waveform that may be produced by an embodiment of a DC-to-DC converter in accordance with the present invention, such as, for example, one that operates substantially in the manner previously described. This plot is not drawn to scale and is solely provided for the purpose of illustrating overall operation of one possible embodiment. The plot initially illustrates the operation of the main channel ripple regulator until a transient voltage occurs. This transient is typically the result in a change in load. As a result, the transient suppression ripple regulator begins operation, for example, in the manner previously described for this embodiment. As illustrated, although the average output voltage is reduced as a result of the occurrence of the transient voltage in this example, nonetheless, the transient suppression ripple regulator operates to decrease the overall drop in the average output voltage, as desired.

The embodiment in FIG. 2 is similar in operation to the embodiment described with respect to FIG. 1, except that the inductance is provided on a winding of transformer 230. Therefore, in this embodiment, extra inductor 280 is not employed. Similar to the operation described above, in FIG. 2, as above, 610 charges 620. 630 supplies current on a voltage decrease(load increase) at V5, while 640 sinks current through 610 for an increasing voltage at V5. Of course, the ripple regulator operation is substantially the same for both circuit embodiments illustrated, although the invention is not limited in scope in this respect.

An embodiment of a method of suppressing a voltage transient in a DC-to-DC converter in accordance with the invention includes the following. When the converter load voltage occurs outside a substantially predetermined range is sensed. For example, although the invention is not limited in scope in the respect, as previously described for the embodiment illustrated in FIG. 1, this may be sensed using comparators, such as 240 and 250. The converter load current is then adjusted in response to the sensed load voltage being outside the substantially predetermined range. For example, as previously described, the DC-to-DC converter embodiment illustrated in FIG. 1 has a primary inductor. Therefore, the circuit embodiment includes another circuit inductance that is smaller than the inductance of the primary inductor. This smaller inductance may be employed to sink and source current, and, thereby adjust the load current. For example, ripple regulation may be applied. As described of the previous embodiment, this ripple regulation limits the swing of the output voltage and, therefore, suppresses the voltage transient, as desired.

While certain features of the invention have been illustrated as described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A DC-to-DC converter comprising:
    a first circuit to sense a voltage transient when the converter load voltage occurs outside a substantially predetermined range;
    a second circuit to adjust the converter load current based, at least in part, upon signals provided by the first circuit; and
    a primary inductor;
    wherein the second circuit includes another inductor having an inductance smaller or less than the inductance of the primary inductor.

2. The DC-to-DC converter of claim 1, wherein the smaller inductance is coupled in the second circuit to apply ripple regulation to adjust the converter load current.

3. The DC-to-DC converter circuit of claim 2, wherein the first circuit includes comparators to sense when the converter load voltage occurs outside a substantially predetermined range.

4. The DC-to-DC converter of claim 3, wherein the second circuit includes the smaller inductance coupled in the second circuit so as to apply ripple regulation to adjust the converter load current based, at least in part, upon output signals of the comparators of the first circuit.

5. The DC-to-DC converter of claim 1, wherein said DC-to-DC converter comprises a buck converter configuration.

6. The DC-to-DC converter of claim 1, wherein said buck converter configuration employs ripple regulation.

7. The DC-to-DC converter circuit of claim 3, wherein the first circuit includes comparators to sense when the converter load voltage occurs outside a substantially predetermined range.

8. The DC-to-DC converter of claim 1, wherein the DC-to-DC converter includes a primary inductor sufficient to convert an input DC voltage to an output DC voltage approximately an order of magnitude smaller or less.

* * * * *

UNITED STATES PATENT AND TRADEMARK OFFICE
CERTIFICATE OF CORRECTION

PATENT NO.      : 6,285,175 B1                                        Page 1 of 1
DATED           : September 4, 2001
INVENTOR(S)     : Massie et al.

It is certified that error appears in the above-identified patent and that said Letters Patent is hereby corrected as shown below:

<u>Title page,</u>
Item [75], delete "Howard" and replace with -- Harold --.

Signed and Sealed this

Twenty-fifth Day of June, 2002

Attest:

Attesting Officer

JAMES E. ROGAN
*Director of the United States Patent and Trademark Office*